United States Patent [19] Blackman

[11] 4,177,365

[45] Dec. 4, 1979

[54] MOISTURE REDUCER FOR USE IN HEATED AND VENTED CONTAINER INCLUDING ELECTRICAL CONTACTS

[76] Inventor: Stanley J. Blackman, Brockton YMCA, Brockton, Mass. 02401

[21] Appl. No.: 872,071

[22] Filed: Jan. 25, 1978

Related U.S. Application Data

[63] Continuation-in-part of Ser. No. 803,760, Jun. 6, 1977, abandoned, which is a continuation-in-part of Ser. No. 755,017, Dec. 28, 1976, abandoned.

[51] Int. Cl.[2] ...................... H01H 19/00; B65D 81/26; C09K 3/00

[52] U.S. Cl. .......................... 200/19 R; 123/146.5 R; 200/19 DC; 200/302; 206/204; 252/194; 312/31

[58] Field of Search .......... 200/19 DC, 19 R, 19 DR, 200/293, 302, 306; 335/202; 252/194; 337/280; 206/204; 312/31, 313; 219/202, 209; 123/146.5 R, 146.5 A

[56] References Cited

U.S. PATENT DOCUMENTS

| | | | |
|---|---|---|---|
| 848,960 | 4/1907 | Braun | 252/194 |
| 1,353,800 | 9/1920 | Edgerton | 200/19 DC X |
| 1,869,518 | 8/1932 | Smith | 252/194 |
| 1,887,349 | 11/1932 | Hammond | 252/194 |
| 2,067,391 | 1/1937 | Good | 200/19 DR |
| 2,086,522 | 7/1937 | Bergstrom | 200/19 DC |
| 2,107,709 | 2/1938 | Oberdick | 200/19 DR X |
| 2,163,901 | 6/1939 | Walker et al. | 252/194 |
| 2,251,387 | 8/1941 | Arthur | 200/19 DR X |
| 2,293,901 | 8/1942 | Hutchinson | 252/194 X |
| 2,365,925 | 12/1944 | Zoerlein et al. | 200/19 DC |
| 2,388,390 | 11/1945 | Cook et al. | 252/194 |
| 2,425,250 | 8/1947 | Lamb | 312/31 X |
| 2,545,160 | 3/1951 | Miller | 312/31 X |
| 2,558,076 | 6/1951 | Elsey | 200/237 |
| 2,885,746 | 5/1959 | Gura | 252/194 |
| 2,943,169 | 6/1960 | Rice | 200/302 X |
| 3,217,113 | 11/1965 | Willson et al. | 200/19 DC |
| 3,243,560 | 3/1966 | Wilson | 174/14 R X |
| 3,301,788 | 1/1967 | Cummings et al. | 252/194 |
| 3,336,457 | 8/1967 | Julian et al. | 200/19 R |
| 3,545,622 | 12/1970 | Sakhnovsky et al. | 252/194 |
| 3,632,965 | 4/1972 | Guth et al. | 200/19 DC X |
| 3,660,626 | 5/1972 | Kawamura et al. | 200/302 X |
| 3,829,635 | 8/1974 | Elwert et al. | 200/19 DC X |
| 4,036,360 | 7/1977 | Deffeyes | 252/194 X |
| 4,112,283 | 9/1978 | Lathrop | 200/302 |

*Primary Examiner*—James R. Scott

[57] ABSTRACT

An article of manufacture comprising a vented container having a desiccant mounted therein for reducing the relative humidity of and gases within the container, the container having at least two electrical contacts positioned therein, one of which is moveable in relation to the other. The desiccant may be positioned within a receptacle having means for permitting contact of the internal container environment with the desiccant. The invention is particularly effective where ambient temperatures rise to above 100 degrees F., thereby regenerating the desiccant. The container may be substantially formed of a desiccant having its external surface coated with an insulating, water impermeable material and having selected portions of its internal surface coated with a material similar to the external coat.

7 Claims, 12 Drawing Figures

MOISTURE REDUCER FOR USE IN HEATED AND VENTED CONTAINER INCLUDING ELECTRICAL CONTACTS

BACKGROUND OF THE INVENTION

This application is a continuation-in-part of a continuation-in-part application, Ser. No. 803,760, filed June 6, 1977, which in turn was a continuation-in-part application of the parent application Ser. No. 755,017 filed Dec. 28, 1976, now both abandoned.

This invention relates to a desiccant that is attached or otherwise fixed in a container in which an electrical current is made and interrupted by the electrical engagement of two contact points. The desiccant may be housed in a receptacle having an aperture provided therein to allow the desiccant contact with the environment of the container.

In electrical systems which employ two or more contacts utilized to make or break an electrical circuit, such as in an automotive distributor, corrosion or pitting of the contacts can seriously impair efficiency and ultimately cause a break-down of the electrical circuits involved. Moisture can create conductive paths causing misfiring of the cylinders.

For example, one of the ways that moisture reaches an automotive distributor is through a path commencing at the engine intake continuing through the intake chamber, thence to the combustion chamber and down through the piston rings into the crankcase where the relative humidity builds up. This moisture is forced by the oil pump or by combustion pressure up the distributor shaft and finally into the distributor. The increased relative humidity of the distributor may cause a misfire of one of the cylinders or burn or break a valve. Backfiring may occur with attendant dangers of fire or damage to the exhaust system.

The effect of moisture on the operation of an electric switch system is particularly detrimental when the system is activated. In the case of automotive distributors, excess moisture in the distributor is one of the chief reasons motor vehicles fail to start.

As is well known in the art, moisture assists in the formation of aqueous electrolyte from contaminants and the activity of the electrical engagement of the two contacts. The aqueous electrolyte condenses on exposed metal surfaces encouraging corrosion of these surfaces. Early in the history of the use of distributors in automobiles, attempts were made to have the housing of the distributor air tight to maintain a moisture-free environment. This approach, which required a hermetically sealed fit between the distributor cap and the housing, is very difficult and expensive to realize.

Another method of preventing the effects of moisture and particulate matter was to provide openings in the distributor walls in an effort to create a ventilating effect in the distributor compartment. This approach was not successful without providing a means of screening out as much moisture and dust as possible. The patent to Gibson et al, U.S. Pat. No. 2,150,859, issued Mar. 14, 1939 is an example of a device which furnishes such screening.

The patent to Oberdick, U.S. Pat. No. 2,107,709, issued Feb. 8, 1938, utilizes a bladed rotor arm which agitates the air in the distributor compartment to facilitate removal of deleterious materials and prevent those that remain from damaging the contacts. The patent to Julian et al, U.S. Pat. No. 3,336,457, issued Aug. 15, 1967, discloses another device for filtering air utilizing a porous material. This type of filter appears to be concerned with preventing ingress of particulate matter into the distributor.

The patent to Brown, U.S. Pat. No. 848,960, issued Apr. 2, 1907, discloses the use of calcium chloride in a matrix of plaster of paris and ground turf. The charged matrix is placed in a perforated receptacle lining the container. There is no indication that the desiccant and its matrix were intended to be used in a heated and vented compartment containing moveable electrical contacts, nor is there an indication that the desiccant is to be utilized without the perforated receptacle. The walls of the receptacle abut the walls of the container and are not attached.

The patent to Kawamura et al, U.S. Pat. No. 3,660,626, issued May 2, 1972, discloses a distributor cap having a catalyst case opening into the cap and containing a catalytic material for decomposing ozone. The carrier of the catalytic material is water absorbing. The distributor cap in this patent is specifically disclosed as sealed. The use of a desiccant in a receptacle mounted within a sealed container is also disclosed in the patent to Rice, U.S. Pat. No. 2,943,169, issued June 28, 1960.

Both the Kawamura, et al and the Rice patents stress the fact that the container is sealed from the outside environment. The instant invention on the other hand is utilized in containers that are vented to the outside environment and are situated in an environment that is at times intermittently heated.

The patent to Willson et al, U.S. Pat. No. 3,217,113, issued Nov. 9, 1965, discloses a distributor cap whose internal surface is sprayed with a relatively thin layer of hydrophobic material to reduce wettability. The instant invention coats portions of the internal surface of the distributor cap with a desiccant adapted to be completely or partially regenerated on application of heat within the distributor cap which on almost all modern automobiles is not completely sealed. The teaching of Willson et al, discloses the use of hydrophobic material, the antithesis of utilizing desiccants as a coating on the interior wall of a distributor cap.

The inventor discovered that the use of a desiccant within the container of a device utilizing electrical contacts or a reluctor and a pickup coil assembly of a high energy system will substantially reduce "wet" atmosphere corrosion of exposed metal surfaces and will reduce moisture which may create start up problems. Furthermore, the use of a receptacle, formed of a non-corroding, substantially impermeable material, for holding the desiccant, insulates potentially corrosive desiccant materials from the metallic elements within the distributor thereby allowing desiccant materials which corrode metals (for example, anhydrous calcium chloride) to be employed.

Use of the invention will reduce the relative humidity of the compartment housing the electrical elements in an inexpensive, facile, and non-detrimental way thereby increasing their working life.

SUMMARY OF THE INVENTION

As used in this specification, the word "container" means the housing within which the electrical device is mounted, for example, an automotive distributor; the word "compartment" means the enclosure within which the container is positioned such as an automobile engine compartment; the word "receptacle" means the device for holding a desiccant, when desired, within a container; the words "internal environment" mean the things and conditions within the area defined by the container; and the words "external environment" mean the things and conditions outside the area defined by the container such as an automobile engine compartment.

The present invention utilizes a desiccant material which is positioned within an electrical device comprising a container or housing having electrical contacts (electrical elements) or a reluctor and a pickup assembly of a high energy system or any electrical switching means therein, for example, a distributor for an internal combustion engine or a switch. The desiccant may be used by attaching or coating it directly to the inner wall surface of the container or to an element of the device. The coat in this case is rather thick, about a 1/32 of an inch or more would be satisfactory. The desiccant can also be positioned within a receptacle which may be formed of a substantially impermeable, non-corrosive material thereby increasing the number of desiccants that can be effectively employed. The receptacle containing the desiccant includes at least one opening or vent to allow the atmosphere of the compartment (the external environment of the container) to contact the desiccant. The moisture in the internal atmosphere of the container and some of the particulate material is absorbed by the desiccant preventing formation of corrosives thereby avoiding pitting or damage to the distributor contacts and insuring easy activation of the electrical device. The receptacle may be any convenient shape that will not interfere with the operation of the distributor. For example, a strip of a moldable, non-corrosive desiccant may be held to a surface by a single strap (i.e. receptacle) or may be held by a pair of plastic end caps or bags, which are attached to the surface. In this case, most of the surface of the desiccant is exposed to the environment. The receptacle may be adhered or otherwise attached to the inner wall of the distributor cap or may be formed as an integral part of the cap. It may also be formed as a donut shape attached circumferentially to the shaft of the rotor or molded in place within the device.

The container itself may be formed of a moldable desiccant such as plaster of paris or silico aluminate with an organic binder with sufficient mechanical strength to support its own weight. The outer surface of the container is coated with a water impermiable, electrically insulative material. Selected portions of the internal surface are also coated with similar materials. There are a number of well known natural and artificial rubbers as well as several plastic materials such as powders of epoxy, polyvinyl chloride, polyesters and acrylics which are applied in a manner well known in the art. Electrical current carrying elements such as terminals are electrically insulated from the container where necessary.

The inventor discovered that the efficiency and useful life of some desiccants are substantially increased when used in a distributor due to the fact that the distributor has openings (i.e. is vented) into the engine compartment and that the ambient temperatures in an operating engine rise to over 180 degrees F, thereby partially regenerating the desiccant. In other words, the compartment is periodically heated thereby regenerating the desiccant.

The use of the invention not only reduces corrosion, but of equal importance will prevent moisture from interferring with activation and operation of the switch system. Its effectiveness over a long period of use, without replacement, is maintained by partial or complete regeneration of the desiccant due to ambient heat and to ventilation of the container. Venting of the container which occurs in most of the presently available automotive distributors can be increased by forming through-apertures in the container walls.

BRIEF DESCRIPTION OF THE DRAWINGS

Further details are explained below with the help of the examples illustrated in the attached drawings, in which.

DESCRIPTION OF THE PREFERRED EMBODIMENTS

Figure 1:
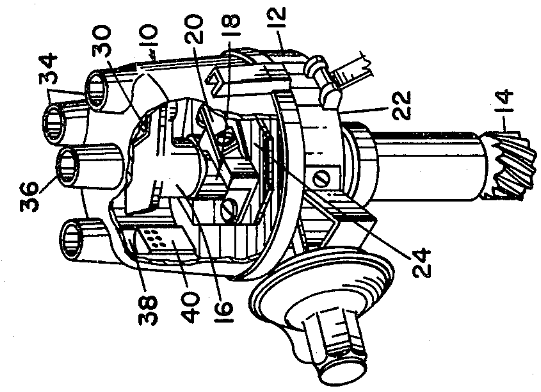
FIG. 1 is a perspective view, partly in section, of an automotive distributor showing a receptacle, according to the present invention, in position.

There is shown in the drawings, at FIG. 1, an automotive distributor having a distributor cap 10 and a distributor housing 12. The distributor housing 12 has a mainshaft 14 mounted axially therewith passing through a central hole in the base 22 of the housing 12. The mainshaft 14 is driven at one end by the camshaft (not shown), in a manner well known in the art, and has a rotor 16 mounted at its other end. A cam 18 is mounted in a fixed, circumferential, abutting relationship to the mainshaft 14 on a plane determined by the position of the contact set or breaker points 20. The cam 18 is multilobed having the same number of lobes or ridges and flats as the number of cylinders in the engine. A breaker plate 24 is mounted, usually by screws, within the housing 12 in superposed, proximate relation to the base 22. The mainshaft 14 passes centrally through the breaker plate 24. The moveable contact of the contact set 20 is attached to and insulated from the breaker plate 24 and includes a nylon rubbing block which rides on the cam 18. In order to avoid the problems associated with coil saturation, some makes of automobiles have employed two sets of points (not shown).

The fixed contact of the contact set 20 is attached to the breaker plate 24 and is positioned to electrically engage the moveable contact when the rubbing block rides a flat of the cam 18. Rotation of the cam 18 thus opens and closes the contact set 20. When the contact set 20 is open, current flows from the secondary winding of the coil (not shown) through a high voltage cable to the central terminal 32 of the cap 10 thence to the rotor contact 30 and the electrically engaged plug-lead terminal 28 to the appropriate spark plug. Current to the contact set 20 is received from the primary winding of the coil through the moveable contact to the fixed contact and thence to ground when the contact set 20 is closed. For the sake of simplicity and clarity, accessories well known in the art such as spark advance mechanisms, cam lubricator, etc., are not illustrated in the drawings.

The rotor 16 is formed of an insulating material and has a configuration which provides proper clearance in relation to the plug-lead terminals 28 in the cap 10. The rotor 16 carries a metal rotor contact 30 on its upper surface in permanent electrical contact with the central terminal 32 of the cap 10. The rotor contact 30 is extended along the upper surface of the rotor 16 so that the contact's terminal end, remote from its permanent electrical engagement with the central terminal 32, will electrically engage each of the plug-lead terminals 28 in a timed sequence.

The distributor cap 10 is cup-shaped in configuration having a plurality of plug-lead towers 34 around the outer periphery of the body of the cap 10. The plug-lead towers 34 are in spaced relation to each other and each of them contains a plug-lead terminal 28 which extends into the compartment defined by the cap 10. A central tower 36, housing the central terminal 32, extends upwardly from the top of the cap 10, at the center of the circle defined by the plug-lead towers 34. The cap 10 includes a peripheral shelf at its open end which rests on an upwardly extending wall of the distributor housing 12 when the two parts are engaged. Locking means, well known in the art, hold the parts together during use. There are openings between the cap 10 and the housing 12 where they engage each other providing venting means between the internal environment (i.e. chamber) of the distributor (container) and the external environment (engine compartment) of the distributor.

In many modern distributors, each of the plug-lead towers 34 have a portion of their walls continued to provide troughlike depressions 38 in the surface of the wall of the distributor cap 10. The number of plug-lead towers 34 corresponds to the number of cylinders in the engine.

The desiccant receptacle 40 may be generally box-like in configuration having a rectangular front wall 42, a side wall extending from each long edge of the front wall 42, merging into a back wall 44. The back wall 44 and the side walls may be arced to conform to the inner surface of the wall of the cap 10. A bottom wall 46 connects the front, side and back walls at one end of the receptacle 40, and a top wall 48 is provided at the opposite end of the receptacle 40 from the bottom wall 46 connecting the front, side and back walls completing the receptacle 40 as a substantially sealed unit. The receptacle can be formed as one piece, except for the top wall 48, the desiccant is then inserted within the receptacle and the top wall is subsequently positioned and sealed in place.

Figure 4:
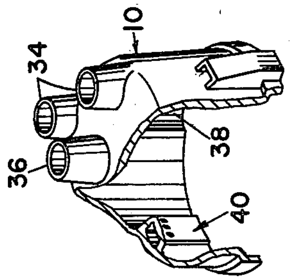
FIG. 4 is a perspective of a distributor cap partially broken away showing the receptacle, according to the present invention, integral with cap.
Figure 3:
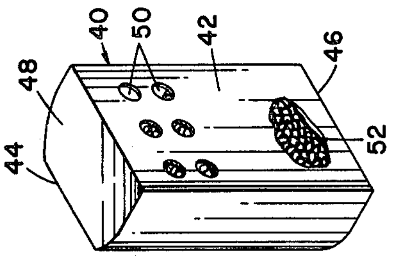
FIG. 3 is a perspective of the receptacle, according to the present invention, partially broken away to show the desiccant.
Figure 2:
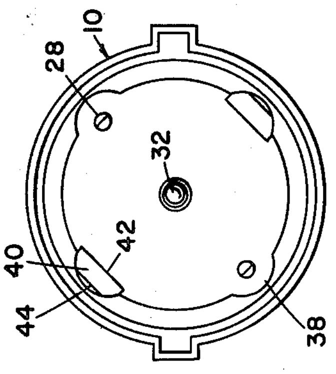
FIG. 2 is a plan view of a distributor cap showing a receptacle, according to the present invention, in position.
Figure 5:
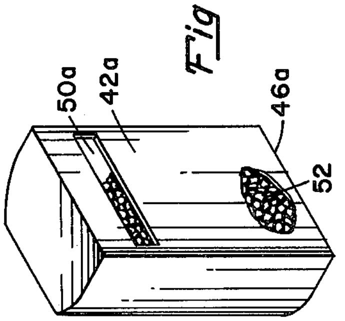
FIG. 5 shows a modification of the receptacle of FIG. 3 with a single slot.

The front wall 42 has a series of spaced apertures 50 formed therethrough (for a purpose to be described hereinafter) on planes predetermined distances from the bottom wall 46. The apertures 50 may be positioned in the sides of the receptacle if desired. The embodiment described is designed as a throwaway, however, the top wall 48 may be omitted allowing the receptacle 40 to be emptied of used desiccant and refilled with fresh desiccant. The receptacle 40 may also be formed integral with the wall of the distributor cap 10, in which case the back wall 44 would be the wall of the cap 10 and the top wall 48 would be omitted and that end of the receptacle would face towards the towers of the cap 10 as shown in FIG. 4. If desired, a single rectangular opening **50*a* extending across a front wall 42*a* in parallel relation to the plane of the bottom wall 46*a*** may take the place of the apertures 50 as shown in FIG. 5. The apertures may be covered with removeable tape, for example, prior to installation.

The distributor cap 10 is usually constructed of Bakelite, although other insulating materials have been utilized.

There are several methods of mounting the receptacle 40 in the cap 10. As mentioned heretofore, the receptacle 40 may be formed integral with the cap 10. It may also include an adherent, such as rubber cement, on the external surface of the back wall 44, or utilize a double tape thereby permitting adherence to the wall of the cap 10 within the depression 38, if such are available. An adhesive tape (not shown), may be also attached to the receptacle 40, at its top and bottom, for example, to adhere it to the wall of the cap 10. Adherence should be sufficient to hold the receptacle 40 to the cap 10 under ambient conditions while allowing removal when required.

Figure 7:
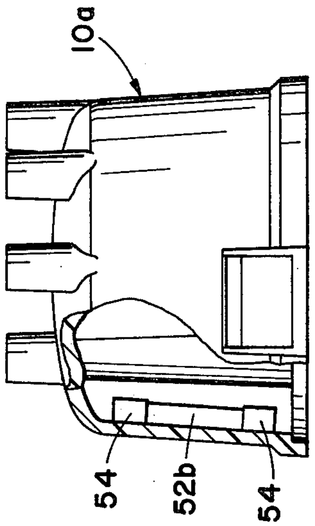
FIG. 7 is a side elevation partly in section of a distributor cap showing the desiccant held in place by a two-piece receptacle.

A type of holder or receptacle which permits maximum exposure of the desiccant is illustrated in FIG. 7. The strip of desiccant **52*b* is held by inserting each of its ends into a small bag 54 formed of a flexible plastic such as polyethylene. The assembly of the bags and the engaged desiccant 52*b* is then attached to the inner surface of the wall of the compartment 10*a*, such as a distributor cap, containing the electrical elements, by an adhesive such as rubber cement, or a double surface tape. The assembly may be attached to any compartment surface as long as it does not interfere with the operation of the device within the compartment. The desiccant 52*b*** is formed of a moldable, non-corrosive desiccant such as silico-aluminate with an organic binder, anhydrous calcium sulfate or plaster of paris in the regular form or in its other forms such as Keenes cement, Mach's cement, Martin's cement or Parina cement.

The ends of the strip **52*b* may also be engaged by pressing it within caps formed of a plastic material which are then adhered or otherwise attached to the inner surface of the compartment. The side of the strip 52*b*,** which will abut or be in close proximity to the side of the compartment may be shaped to conform to the contour of the inner surface of the wall of the compartment.

Where the receptacle is not formed integral with the cap 10, it could be constructed of many different types of corrosive resistant thermoset and thermoplastics such as polyethylene polypropelyne, polyvinylchloride, polymethyl-methacrylate, acrylonitrile-butadiene-styrene copolymers, fluorinated ethylene propylene copolymers, the copolymer of vinylidene fluoride, and hexifluoropropylene, reinforced phenolic resins, reinfored polyester resins, epoxide resin laminates and furon resin laminates. In fact, any non-corrosive, electrically insulating material may be used.

A desiccant 52 is placed within the receptacle 40 to provide the means of controlling moisture in the distributor. Preferably the desiccant 52 will be one that is low cost, easy to handle and non-corrosive. Desiccants which meet these requirements are silica gels, activated alumina, a silico aluminate with an organic binder, a form of which is sold under the trademark Natrasorb by Multiform Desiccant Products, Inc., of Buffalo, N.Y., calcium oxide, and anhydrous calcium sulfate. Since the desiccant, for the most part, is isolated by the receptacle from the metallic elements of the distributor, the list of those which may be acceptable although corrosive to metals could include: Barium oxide, anhydrous magnesium perchlorate, potassium oxide, calcium chloride, sodium hydroxide, barium perchlorate, zinc chloride, anhydrous copper sulfate, potassium chloride, potassium nitrate, sodium nitrate, or lithium chloride. The desiccant, depending on physical composition, may be loosely placed in the receptacle 40, filling its area from the bottom wall 46 up to a plane below the apertures 50, or it may be placed in bags, solid form, or as impregnated paper, to substantially fill the receptacle 40. Many of the mentioned desiccants may have a small quantity of cobalt chloride added to them either in the form of a crystal or an impregnated paper. When the water content of the desiccant exceeds a useful limit, the blue cobalt chloride changes to pink providing a visual indication of when to change the desiccant. The desiccant receptacle 40 may be positioned on any internal surface of the distributor cap 10, or the housing 12, as long as the receptacle dimensions provide clearance for the moving parts of the distributor and do not interfere with its efficient operation.

Figure 6:
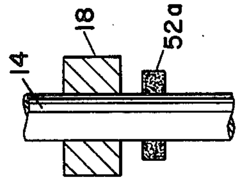
FIG. 6 is a side elevation partly in section of an automotive distributor shaft, a cam, and a desiccant showing the desiccant attached to the shaft.

A silico aluminate with an organic binder or calcium sulfate, in its plaster of paris form may be molded into a donut shape, as a desiccant 52*a*, and attached in circumscribing relation to the shaft of the distributor below the cam 18, for example a press fit as shown in FIG. 6. This would allow the desiccant to operate without the use of a receptacle.

Figure 9:
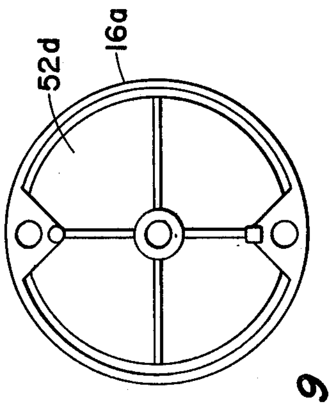
FIG. 9 is a bottom elevation of an automobile rotor body portion showing a desiccant molded in place.
Figure 8:
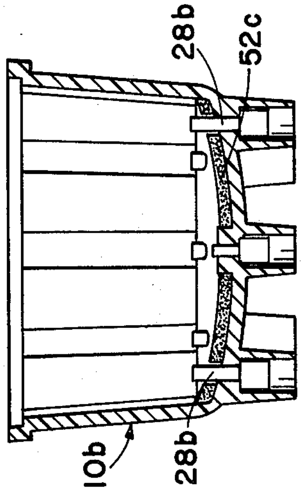
FIG. 8 is a sectional side elevation of a distributor cap with the desiccant molded in place.
Figure 10:
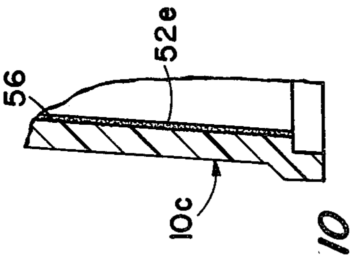
FIG. 10 is a section of a roughened surface of the wall of a distributor showing a desiccant "molded" to the surface.

Moldable desiccants such as silico aluminate with an organic binder or anhydrous calcium sulfate may be directly cast in the "mold" formed by the walls of the compartment such as the upper portion of a distributor cap or in an element such as an electrical element support of the device within the compartment, for example, the body portion of the distributor rotor. In these cases the desiccant is formed into a substantially unitary mass. A plaster of paris can be prepared by thoroughly mixing anhydrous calcium sulfate with water in a 1:¼ proportion. The plaster of paris is then poured into a distributor cap 10*b* after shielding the central terminal and the plug-lead terminals 28*b* with a plastic sleeve (not shown). A fairly thick layer of plaster of paris approximately 1/32 of an inch is formed in the top of the distributor cap 10*b* as shown in FIG. 8. The assembly may then be dried in a low humidity atmosphere or may be dried in an oven at 375–450 degrees F. for 1 or 2 hours or until the plaster of paris sets. The plastic sleeves are trimmed to assure proper electrical operation. Plaster of paris or a silico aluminate with an organic binder 52*d* may be similarly molded in place with certain types of electrical element supports such as a body portion of a distributor rotor, one of which is illustrated in FIG. 9. The plaster of paris 52*d* is carefully poured into the cup-like distributor cap 10*b*. The inventor has also discovered that moldable desiccants may be poured onto the inner surface of the sides of a container, for example, a distributor cap 10*c*. In order to assure that a moldable desiccant 52*e*, such as plaster of paris, will remain attached, the inner surface may be sandblasted providing a rough or pitted surface 56 as shown in FIG. 10. The desiccant may also be a mixture of silico aluminate with an organic binder and plaster of paris. A proportion of ⅛:1 of silico aluminate and plaster of paris with a small proportion of $H_2O$, has been found acceptable.

Another method of utilizing a moldable desiccant within a distributor cap is to form a sleeve of the desiccant having an outer diameter approximately equal to the inner diameter of the wall of the distributor cap. The sleeve is then press fitted within the distributor cap with its outer surface abutting the cap wall. Obviously the sleeve must be designed so that it will not interfere with the operation of the distributor.

Anhydrous calcium sulfate is an example of a desiccant which can be regenerated repeatedly by heating to 375–450 degrees F. for one or two hours. Silico aluminate with an organic binder is another example of a desiccant capable of regeneration by heat. There are many desiccants capable of heat regeneration. When small amounts of heat, above 100 degrees F. are applied to a desiccant over a period of time, for example one or two hours, a partial regeneration will occur. This regeneration appears to be aided somewhat if the container, within which the desiccant is positioned, opens (i.e. is vented) into a larger heated compartment. When used in a distributor, the desiccant is regenerated during the operation of the automobile engine and is therefore better prepared to reduce the relative humidity of the distributor (i.e. container) at the crucial time when the engine is started.

Figure 11:
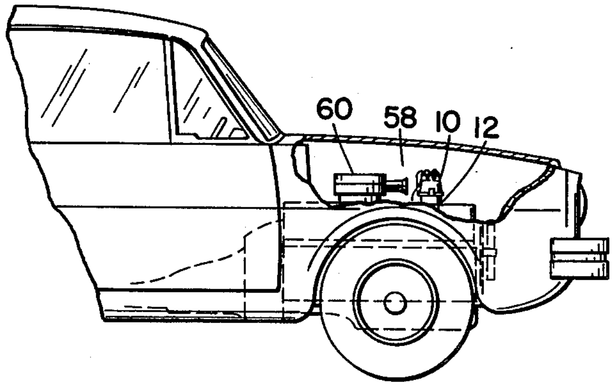
FIG. 11 is a side elevations partly in section of a motor vehicle, with the rear portion broken off, showing the relationship of the automobile engine to a distributor.

There is shown in FIG. 11 a stylized view of an automobile engine compartment 58 indicating the position of the engine 60 which for purposes of this invention is a heat generator and the distributor cap 10 and housing 12 both of which together form a container.

Of further assistance in aiding regeneration of a desiccant positioned in a distributor for an internal combustion engine is the operation of the rotor which agitates the air of the internal environment of the distributor and in effect drives some of the moisture ladened air out of the distributor through the openings therein into the external environment provided by the engine compartment. Several holes or apertures can be formed through the distributor cap wall to increase the ventilation.

Figure 12:
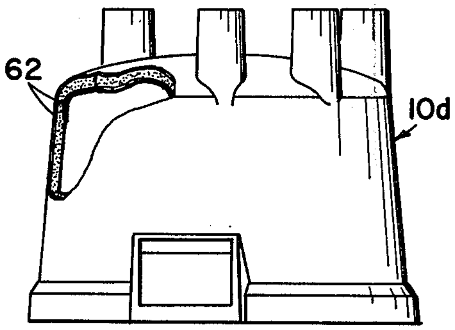
FIG. 12 is a side elevation partly in section of a distributor cap formed of desiccant and having external and internal coatings.

As shown in FIG. 12 the distributor cap 10*d* may be formed of a moldable desiccant such as plaster of paris or silico aluminate with an organic binder, including a cobalt indicator if desired. The major portion of the external surface of the cap 10*d* is coated with a water impermeable, electrically insulating material 62 such as artificial or natural rubbers and plastics, for example, epoxies, polyvinyl chloride, polyesters and acrylics which are applied in a manner well known in the art. The bottom surface of the cap 10*d*, where it engages the housing of the distributor is not coated. A similar coating as that applied to the external surface is applied to the top internal surface of the cap 10*d* circumscribing the terminals and electrically insulating the terminals from each other. This internal coat is carried up the internal surface of the cap wall to a height of approximately ½ inch from the top of the cap or above the plane of the internally positioned surfaces of the plug terminals. The plug and central terminals are also coated with an insulation such as natural or artificial rubber where the terminals pass through and abut the cap 10*d.* For best operating conditions, it is preferable that the engine be at operating temperatures immediately prior to installation of the cap 10*d.*

The invention may be utilized in the same manner as described herein for all transister system distributors, magneto battery timer systems, high energy systems, and in switch housings.

A typical high energy ignition system is the electronic distributor designed by the Chrysler Automobile Company. The electronic distributor includes a distributor cap, rotor, pickup coil assembly, reluctor, shaft assembly and housing. All the methods of positioning desiccants mentioned herein may be used with this type of distributor.

The spaced apertures 50 and the rectangular opening 50*a* are formed in the receptacle to permit contact between the environment of the container and the desiccant.

While the engine is in operation, or at rest, the desiccant action will remove a percentage of the moisture from the internal environment, reducing the relative humidity of the distributor (i.e. container), thereby considerably reducing the possibility of "wet" corrosion of all metal parts within the compartment, or of other problems caused by moisture.

The inventor discovered that the efficiency and useful life of desiccants which can be regenerated is increased by positioning them according to the instant invention in a ventilated container, such as an automobile distributor, whose ambient temperature rise above 100 degrees F. The inventor reiterates that the distributors of modern motor vehicles are not sealed. The engagement of the cap with the housing is a loose engagement permitting air and moisture to enter the distributor from the external environment. Furthermore, the cap is often removed for maintenance and other purposes permitting moisture to enter.

What I claim is:

1. The combination of an article of manufacture and a means of heating same, the article comprising a distributor for an internal combustion engine and a moldable, regenerative desiccant, the distributor including electric switch elements, a cap and a housing, the cap and housing engaged to each other defining a chamber and each having an internal surface, the cap and housing having an external environment outside the cap and housing, the electric switch elements in spaced relation to the desiccant, the chamber vented to the external environment, the desiccant cast in place totally within the chamber forming a solid structure and having a surface exposed to the chamber.

2. The combination of an article of manufacture and a means for heating same as recited in claim 1 further comprising an internal combustion engine, the engine comprising the means for heating the article of manufacture.

3. The combination of an article of manufacture and a means of heating same as recited in claim 2 wherein at least one space provided between the cap and the housing, the space defining a vent between the chamber of the distributor and the external environment.

4. The combination of an article of manufacture and a means of heating same as recited in claim 3 wherein the desiccant is adapted to adhere to at least a portion of the inner surface of the housing.

5. The combination of an article of manufacture and a means of heating same as recited in claim 3 wherein the desiccant is adapted to adhere to at least a portion of the inner surface of the cap.

6. The combination of an article of manufacture and a means of heating same as recited in claim 4 wherein at least a portion of the inner surface of the housing is rough and the desiccant has a thickness of at least 1/32 of an inch.

7. The combination of an article of manufacture and a means of heating same as recited in claim 5 wherein at least a portion of the inner surface of the cap is rough and the desiccant has a thickness of at least 1/32 of an inch.

* * * * *